United States Patent
Sumpter

(10) Patent No.: US 9,755,685 B2
(45) Date of Patent: Sep. 5, 2017

(54) PROTECTIVE DEVICE

(71) Applicant: David Paul Sumpter, New South Wales (AU)

(72) Inventor: David Paul Sumpter, New South Wales (AU)

(*) Notice: Subject to any disclaimer, the term of this patent is extended or adjusted under 35 U.S.C. 154(b) by 0 days.

(21) Appl. No.: 14/410,068

(22) PCT Filed: Jul. 9, 2013

(86) PCT No.: PCT/AU2013/000750
§ 371 (c)(1),
(2) Date: Dec. 20, 2014

(87) PCT Pub. No.: WO2014/008533
PCT Pub. Date: Jan. 16, 2014

(65) Prior Publication Data
US 2015/0326266 A1    Nov. 12, 2015

Related U.S. Application Data

(60) Provisional application No. 61/669,127, filed on Jul. 9, 2012.

(51) Int. Cl.
| | | |
|---|---|---|
| H04B 1/38 | (2015.01) |
| H04B 1/3888 | (2015.01) |
| A45C 11/00 | (2006.01) |
| A45C 11/04 | (2006.01) |
| A45C 13/00 | (2006.01) |
| A45C 15/00 | (2006.01) |
| A45C 13/10 | (2006.01) |

(52) U.S. Cl.
CPC ............ *H04B 1/3888* (2013.01); *A45C 11/00* (2013.01); *A45C 11/04* (2013.01); *A45C 13/005* (2013.01); *A45C 15/00* (2013.01); *A45C 2011/002* (2013.01); *A45C 2013/1015* (2013.01)

(58) Field of Classification Search
CPC ............................ H04B 1/3888; A45C 13/002
USPC .................................. 455/575.1, 575.8, 90.3
See application file for complete search history.

(56) References Cited

U.S. PATENT DOCUMENTS

| | | | | |
|---|---|---|---|---|
| 7,203,533 B1* | 4/2007 | Tischer | ................. | G06F 1/1626 343/787 |
| 2011/0210018 A1* | 9/2011 | Friedman | ............... | A45C 11/04 206/5 |
| 2011/0303560 A1 | 12/2011 | Friedman et al. | | |
| 2012/0083153 A1* | 4/2012 | Schmidt | ................. | F16M 11/10 439/527 |
| 2013/0088813 A1* | 4/2013 | Su | .......................... | G06F 1/1628 361/679.01 |
| 2013/0220847 A1* | 8/2013 | Fisher | .................. | B65D 25/005 206/216 |

(Continued)

FOREIGN PATENT DOCUMENTS

| | | |
|---|---|---|
| CH | 703829 A1 | 3/2012 |
| HU | 0101164 A2 | 7/2003 |

*Primary Examiner* — John J Lee
(74) *Attorney, Agent, or Firm* — AKC Patents, LLC; Aliki K. Collins

(57) ABSTRACT

There is provided a protective device (100) comprising a mobile phone protective portion (110) adapted for receiving at least a portion of a mobile phone device therein in use and an accessory protective portion (105) adapted for receiving at least a portion of an accessory item therein in use.

18 Claims, 3 Drawing Sheets

(56) References Cited

U.S. PATENT DOCUMENTS

| | | | |
|---|---|---|---|
| 2015/0085717 A1* | 3/2015 | Papasakellariou | H04L 5/14 370/280 |
| 2015/0136621 A1* | 5/2015 | Lebauer | B65D 81/02 206/216 |
| 2016/0183231 A1* | 6/2016 | Shi | H04L 1/02 370/329 |

* cited by examiner

PROTECTIVE DEVICE

FIELD OF THE INVENTION

The present invention relates to a protective device and in particular to a protective device comprising a mobile phone protective portion adapted for protecting a mobile phone device and an accessory protective portion adapted for protecting an accessory item.

The invention has been developed primarily for use in protecting a mobile phone and a pair of glasses and will be described hereinafter with reference to this application. However, it will be appreciated that the invention is not limited to this particular field of use. Specifically, the protective device may be adapted for protecting other portable electronic equipment such as tablet computing devices and the like. Yet further, the protective device may be adapted for protecting other accessory items, other than glasses.

BACKGROUND

Protected devices for portable electronic equipment commonplace today usually take the form of rubberised, or silicon mobile phone cases, tablet computing device cases and the like.

However, use of such portable electronic equipment often requires the use of accessory items, such as glasses, styluses and the like. In this regard, a user often carries these accessory items separately, which prone to become lost or damaged.

The present invention seeks to provide a protective device, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY

According to one aspect, there is provided a protective device comprising a mobile phone protective portion adapted for receiving at least a portion of a mobile phone device therein In use; and an accessory protective portion adapted for receiving at least a portion of an accessory item therein in use.

Preferably, the accessory protective portion is adapted for wholly receiving therein the accessory item in use.

Preferably, the accessory item is a pair of glasses.

Preferably, the accessory protective portion comprises padding.

Preferably, the accessory protective portion is substantially elongate.

Preferably, the accessory protective portion composes an opening at one end adapted for receiving the accessory item therethrough in use.

Preferably, the opening is scalable.

Preferably, the accessory protective portion is detachable from the mobile phone protective portion.

Preferably, the accessory protective portion and the mobile phone protective portion are adapted for forming a complementary detachable mechanical, interlock.

Preferably, the complementary detachable mechanical interlock comprises a loop fastener.

Preferably, the accessory protective portion composes an accessory item engagement adapted for engaging the accessory item in use.

Preferably, the accessory protective portion is orientated along an elongate axis of the mobile phone protective portion.

Preferably, the accessory protective portion is pivotably coupled to the mobile phone protective portion Preferably, the protective device umber comprises a hinge between the accessory protective portion and the mobile phone protective portion.

Preferably, the binge is a live hinge.

Preferably, the binge is a butterfly hinge.

Preferably, the accessory protective portion is configurable in a first position with respect to the mobile phone protective portion and a second position with respect to the mobile phone protective portion Preferably, in the first position, the access to protective portion in the mobile phone protective portion substantially coplanar.

Preferably, m the second position, a surface of the accessory protective portion and a surface of the mobile phone protective portion abut.

Preferably, in the second position, a profile of the accessory protective portion corresponds with a profile of the mobile phone protective portion.

Preferably, the accessory protective portion is biased in at least one of the first position in the second position.

Other aspects of the invention are also disclosed.

BRIEF DESCRIPTION OF THE DRAWINGS

Notwithstanding any other forms which may fall within the scope of the present invention, preferred embodiments of the invention will now be described, by way of example only, with reference to the accompanying drawings in which.

DESCRIPTION OF EMBODIMENTS

Figure 1:
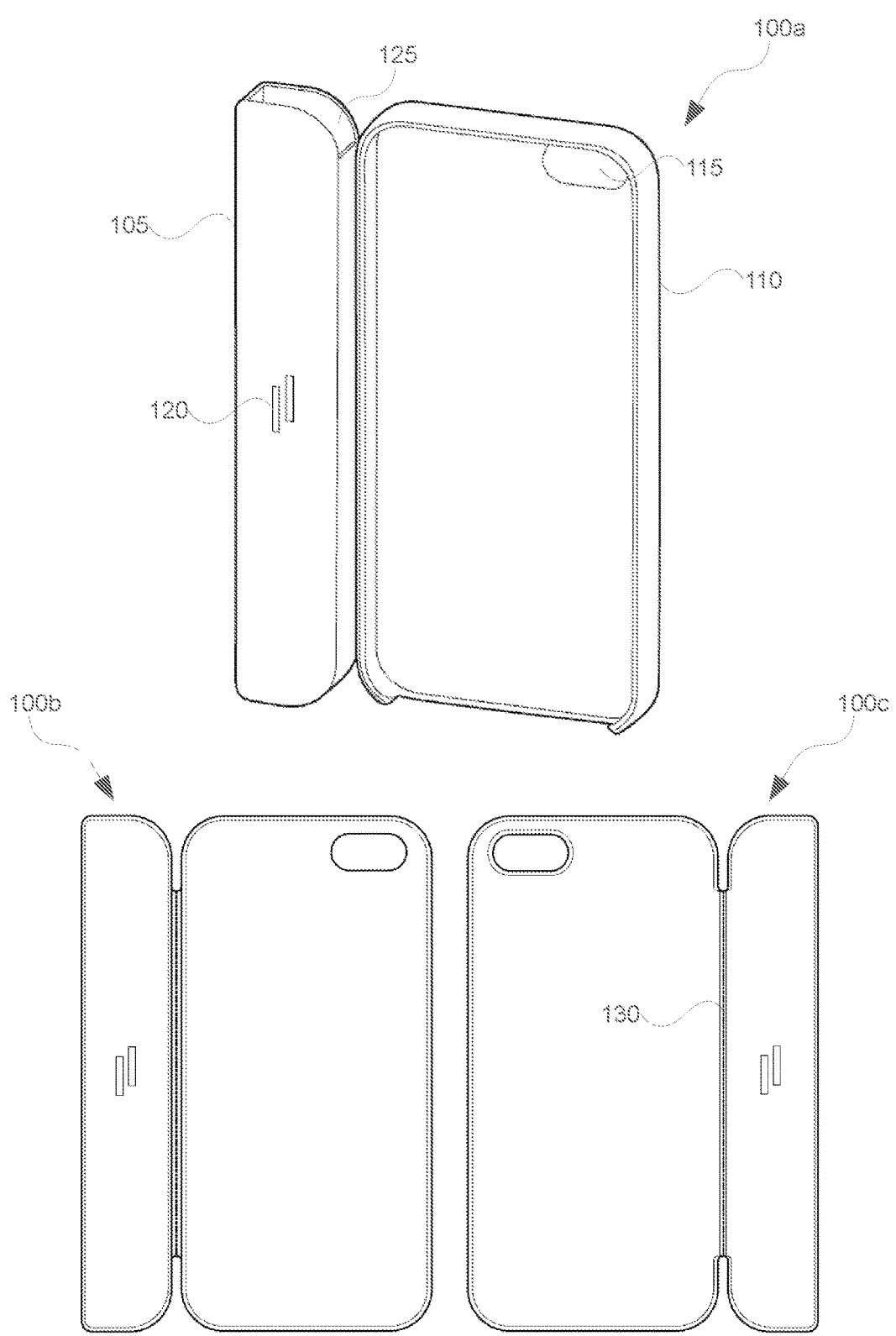
FIG. 1 shows a front perspective view and front and back elevation of use of a protective device in accordance with a preferred embodiment of the present invention.

It should be noted in the following description that like or the same reference numerals in different embodiments denote the same or similar features.

Turning now to FIG. 1, there is shown a protective device 100. As will become apparent from the following description, the protective device 100 is adapted tor protecting a mobile phone device in the normal manner and also an accessory item which may be used in conjunction, with the mobile phone device. In the embodiments described herein, the accessory item is a pair of glasses, such that the protective device 100 allows a person to protect not only their mobile phone device, but also their glasses.

Specifically, the protective device 100 comprises a mobile phone protective portion 110 adapted for receiving at least a portion of a mobile phone therein in use. In the embodiment given, the mobile phone protective portion 110 takes on the traditional mobile phone protective device configuration in comprising a housing adapted for receiving a mobile phone device therein without obscuring the screen of the mobile phone device. The mobile phone protective portion 110 may be further configured so as to provide allowance for various features of the mobile phone, such as a camera aperture 115 adapted to align with a camera of the mobile phone device, electronic connectors the like.

It should be noted that the use of the protective device 100 to protect a mobile phone is a preferred embodiment However, it should be noted that the protective device 100 may similarly be suited for protecting other portable electronic equipment, such as tablet computing devices and the like.

Also provided is an accessory protective portion 105 adapted for receiving at least a portion of an accessory item therein in use. As alluded to above, the embodiments described herein will be described with reference to the use of the accessory protective portion 105 adapted for use in protecting a pair of glasses. However, it should be noted that the accessory protective portion 105 may be suited for protecting other accessory items also, including electronic touchscreen styluses and the like. Furthermore, no technical limitation should be imputed to the word "accessory" as used herein and indeed, the accessory protective portion 105 may be adapted for receiving a protecting an item not necessarily adapted as an accessory for the mobile phone device.

As such, in use, the protective device 100 would be used by a person to simultaneously protect their mobile phone device and their accessory item, described herein as a pair of glasses. The protective device 100 further provides advantages in ensuring that the mobile phone device and the glasses do not become separated in use. Also, as will be described in further detail below, the protective device 100 provides further advantages m taking on a slim profile for allowance of insertion into a pocket, and also for the configuration as a stand for better viewed of the screen of the mobile phone device purposes.

The accessory protective portion 105 comprises an opening 125 adapted for receiving the glasses therethrough. In the embodiments described, herein, the accessory protective portion 105 is adapted for wholly receiving the glasses therein. However, in other embodiments, the accessory protective portion 105 may be adapted for only partially receiving the glasses therein. In yet further, less preferred embodiments, the accessory protective portion 105 need, not necessarily comprise an aperture for receiving the glasses therein and may alternatively take the form of a clip device or the like adapted to merely engaging the glasses.

The accessory protective portion 105 may comprise padding (not shown) within the accessory protective portion 105 to protect the glasses in use, so as to, for example, prevent scratching, abrasion and the like.

In a preferred embodiment, as given in FIG. 1, the opening 125 of the accessory protective portion 105 is open, so as to allow the use of insertion and removal of the glasses in use. However, in other embodiments, the opening 135 may be scalable, such as by way of suitable lid, fastener or the like so as to prevent the glasses from becoming dislodged in use. Also, in other embodiments, the opening 125 of the accessory protective portion 105 need not necessarily be at one end of the accessory protective portion 105. For example, the accessory protective portion 105 may take the form of a receptacle with an operable forward lacing lid wherein, in use, the person would open the lid, insert the glasses into the accessory protective portion 105, and close the lid. In yet further embodiments, the accessory protector portion 105 may comprise an opening 125 at either end of the accessory protective portion 105. In this manner, the user could potentially insert the glasses from either end of the accessory protective portion 105.

The accessory protective portion 125 may comprise a logo 120, which may be embossed into the accessory protective portion 125.

In one embodiment, so as to substantially prevent the glasses from becoming dislodged in use, the interior of the accessory protective portion 105 may comprise inwardly located item engagements or the like so as to interfere with the glasses so as to substantially prevent the glasses from becoming dislodged from the accessory protective portion 105. Such item engagements may take the form of rubber lugs, inwardly dished surface or the like.

In one embodiment, the accessory protective portion 105 may be detachable from the mobile phone protective portion 110. Such may be advantages were the protective device 100 is sold in kit form with a plurality of accessory protective portions 105 each, for example, adapted for a differing size of glasses. In this manner, the user may select the most appropriate accessory protective portion 105 for the user's glasses for engagement with the mobile phone protective portion 110.

In this regard, the accessory protective portion 105 and the mobile phone protective portion 110 may be adapted for forming a complementary detachable mechanical interlock, such as a clip or other similar mechanism, so as to allow the releasable attachment of the accessory protective portion 105, and the mobile phone protective portion 110. In other embodiments, other mechanical interlock, such as Apocalypse fastener may be employed.

In the embodiment given in FIG. 1, the accessory protective portion 105 is orientated alone elongate axis of the mobile phone protective portion 110. In this manner, the interior volume of the accessory protective portion 105 is maximised, advantages for causing a pair of glasses therein. However, it should be noted that in other embodiments, the accessory protective portion 105 may be orientated along the transfers axis of the mobile phone will protective portion 110, such as by being orientated at the top one or the lower edge of the mobile phone protective portion 110. In yet further embodiments, the protective device 110 may compose more than one accessory protective portions 105, such as a first accessory protective portion 105 orientated to the left of the mobile phone protective portion 110 adapted for receiving a pair of glasses therein, and a second accessory protective portion 105 orientated to the right of the mobile phone protective portion 110 adapted for receiving a reading light therein. In it in yet further embodiments, the accessory protective portion 105 need not necessarily be orientated and located along an edge of the mobile phone protective portion 110. For example, the accessory protector portion 105 may be located substantially about a midpoint of a rear surface of the mobile phone protective portion 110.

Now in a preferred embodiment, the accessory protective portion 105 is pivotably coupled to the mobile phone protective portion 110. Referring to the front view 100b and the back view 100c of the protective device 100, there is shown a hinge 130 between the accessory protective portion 105 and the mobile phone protective portion 110.

Figure 3:
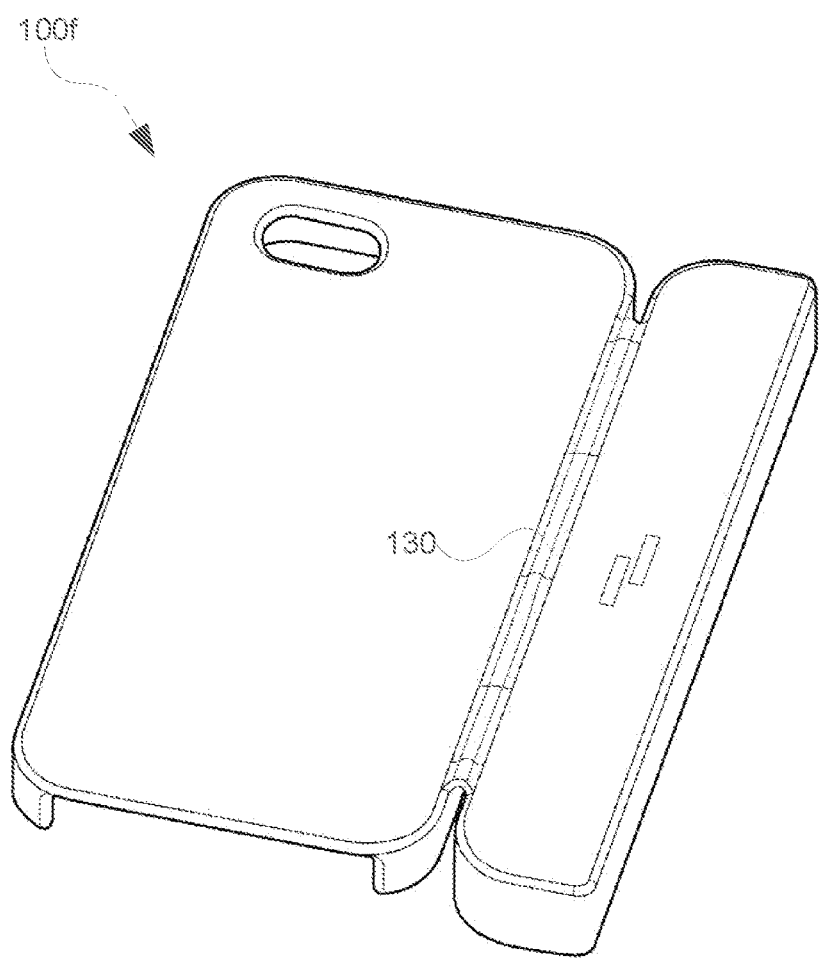
FIG. 3 shows a back perspective view of the protective device of FIG. 1 comprising a butterfly hinge in accordance with another embodiment of the present invention.

In a preferred embodiment, the hinge is a live hinge so as to allow the protective device 100 to be moulded as an integral unit. However, in further embodiments, as is illustrated in FIG. 3 in the perspective back view 100f of the protective device 100, there is shown the hinge taking the form of a butterfly hinge, so as to bias the accessory protective portion 105 in at least one hinge position with respect to the mobile phone protective portion 110.

Figure 2:
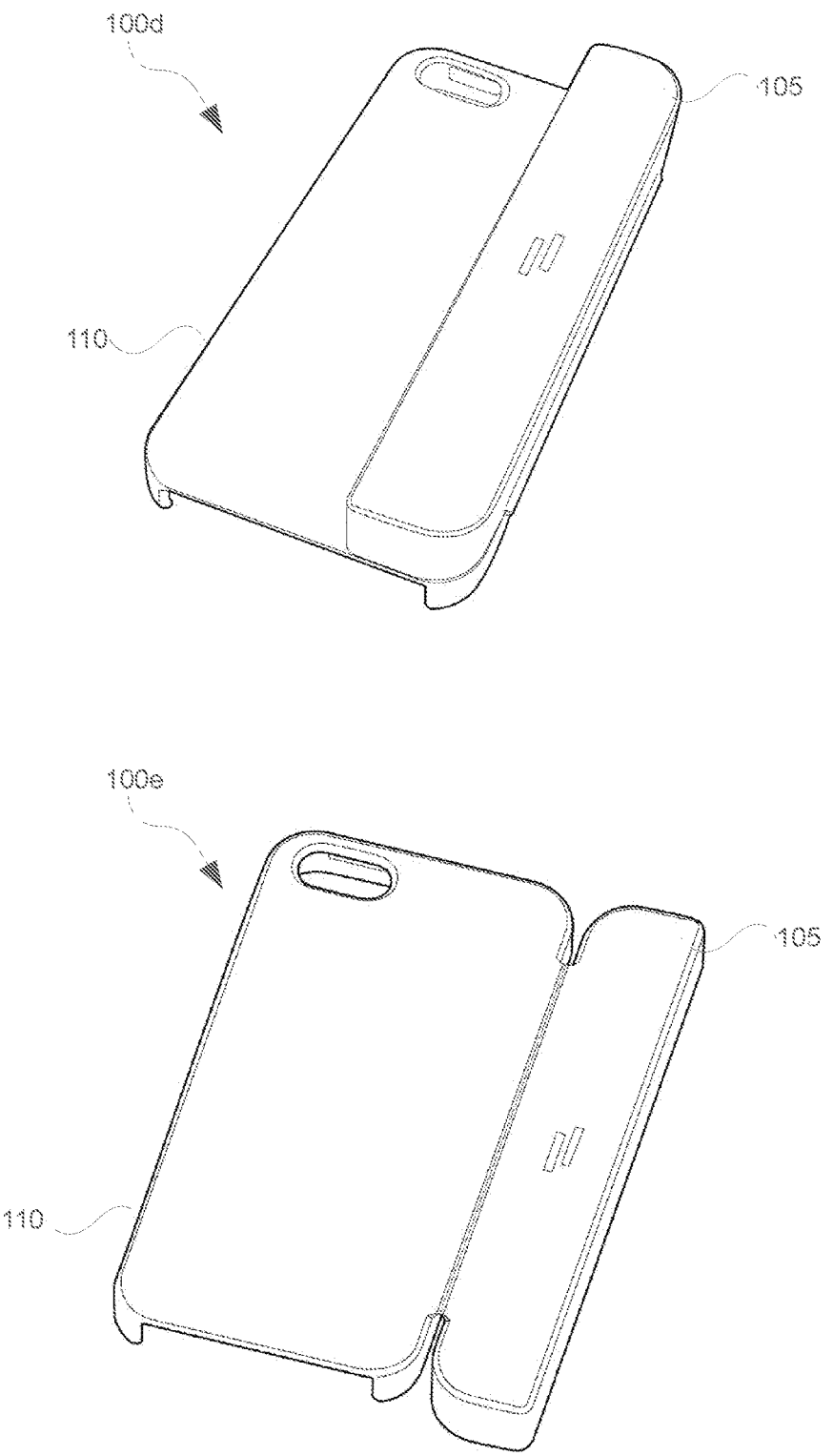
FIG. 2 shows back perspective views of the protective device of FIG. 1 in a first configuration and in a second configuration in accordance with another preferred embodiment of the present invention.

Now, with the accessory protective portion 105 being pivotably coupled to the mobile phone protective portion 110, the protector device 100 may take on the configuration as substantially given in FIG. 2. Specifically, the protective device 100 may take the form of a first configuration 100*d* wherein a surface of the accessory protective portion 105 abuts with a portion of a surface of the mobile phone protective portion 110. In the first configuration 100*d*, the protective portion 100 advantageously may be utilised when as a stand, wherein the screen of the mobile phone device one is angled towards the user in use. Furthermore, in the first configuration 100*d*, the location of the accessory protective portion 105 provides a natural grip for a hand of the person when grasping the protector device 100.

In a second configuration 100*c* the accessory protective portion 105 is substantially coplanar with the mobile phone device protective portion 110. In the second configuration 100*e*, the protective device 100 advantageously allows for the insertion of the protective device into a pocket, for example.

As alluded to above, where the hinge takes the form of a butterfly hinge, the butterfly hinge would bias the accessory protective portion 105 with respect to the mobile phone protective portion 110, in either the first configuration 100*d* or the second configuration 100*c*. Such would prevent the accessory protective portion 105 swinging uncontrollably with reference to the mobile phone protective portion 110. It should be noted that in other embodiments, the protective device 100 may further comprises other fasteners, locking mechanisms or the like to bias or hold the protective device 100 in the first configuration 100*d* or the second configuration 100*e*. For example, the accessory protective portion 105 and the mobile phone protective portion 110 may comprise magnets so as to substantially hold the protective device 100 in the first configuration 100*d*.

It should be noted that the accessory protective portion 105 is preferably shaped such that when the protector device 100 takes the first configuration 100*d*, the edgewise profile of the accessory protective portion 105 comprises substantially with the edgewise profile of the mobile phone protective portion.

Interpretation
Embodiments:

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily ail referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features trial's are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure au understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents winch operate in a similar manner to accomplish a similar technical purpose. Terms such as "forward", "rearward", "radially", "peripherally", "cowardly", "downwardly", and the like are used as words of convenience to provide reference points and are not to be construed as limiting terms.

Comprising and Including

In the claims which follow and in the preceding description of the invention, except where the context requires otherwise cine to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be Interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the protective device industries.

The invention claimed is:

1. A protective device comprising:
 a mobile phone protective portion adapted for receiving at least a portion of a mobile phone device therein in use;
 an accessory protective portion adapted for receiving at least a portion of an accessory item therein in use;
 wherein the accessory item is a pair of glasses;
 wherein the accessory protective portion comprises an opening at one end adapted for receiving the accessory item therethrough in use; and
 wherein the accessory protective portion is pivotably coupled to the mobile phone protective portion.

2. A protective device as claimed in claim 1, wherein the accessory protective portion is adapted for wholly receiving therein the accessory item in use.

3. A protective device as claimed in claim 1, wherein the accessory protective portion comprises padding.

4. A protective device as claimed in claim 1, wherein the accessory protective portion is substantially elongate.

5. A protective device as claimed in claim 1, wherein the opening is sealable.

6. A protective device as claimed in claim 1, wherein the accessory protective portion is detachable from the mobile phone protective portion.

7. A protective device as claimed in claim 6, wherein the accessory protective portion and the mobile phone protective portion are adapted for forming a complementary detachable mechanical interlock.

8. A protective device as claimed in claim 7, wherein the complementary detachable mechanical interlock comprises a loop fastener.

9. A protective device as claimed in claim 1, wherein the accessory protective portion comprises an accessory item engagement adapted for engaging the accessory item in use.

10. A protective device as claimed in claim 1, wherein the accessory protective portion is orientated along an elongate axis of the mobile phone protective portion.

11. A protective device as claimed in claim 1, further comprising a hinge between the accessory protective portion and the mobile phone protective portion.

12. A protective device as claimed in claim 11, wherein the hinge is a live hinge.

13. A protective device as claimed in claim 11, wherein the hinge is a butterfly hinge.

14. A protective device as claimed in claim 1, wherein the accessory protective portion is configurable in a first position with respect to the mobile phone protective portion and the second position with respect to the mobile phone protective portion.

15. A protective device as claimed in claim 14, wherein, in the first position, the accessory protective portion and the mobile phone protective portion are substantially coplanar.

16. A protective device as claimed in claim 14, wherein, in the second position, a surface of the accessory protective portion and a surface of the mobile phone protective portion abut.

17. A protective device as claimed in claim 16, wherein, in the second position, a profile of the accessory protective portion corresponds with a profile of the mobile phone protective portion.

18. A protective device as claimed in claim 14, wherein the accessory protective portion is biased in at least one of the first position in the second position.

* * * * *